Holcroft, Pearson & Shore.
Spinning Mach.

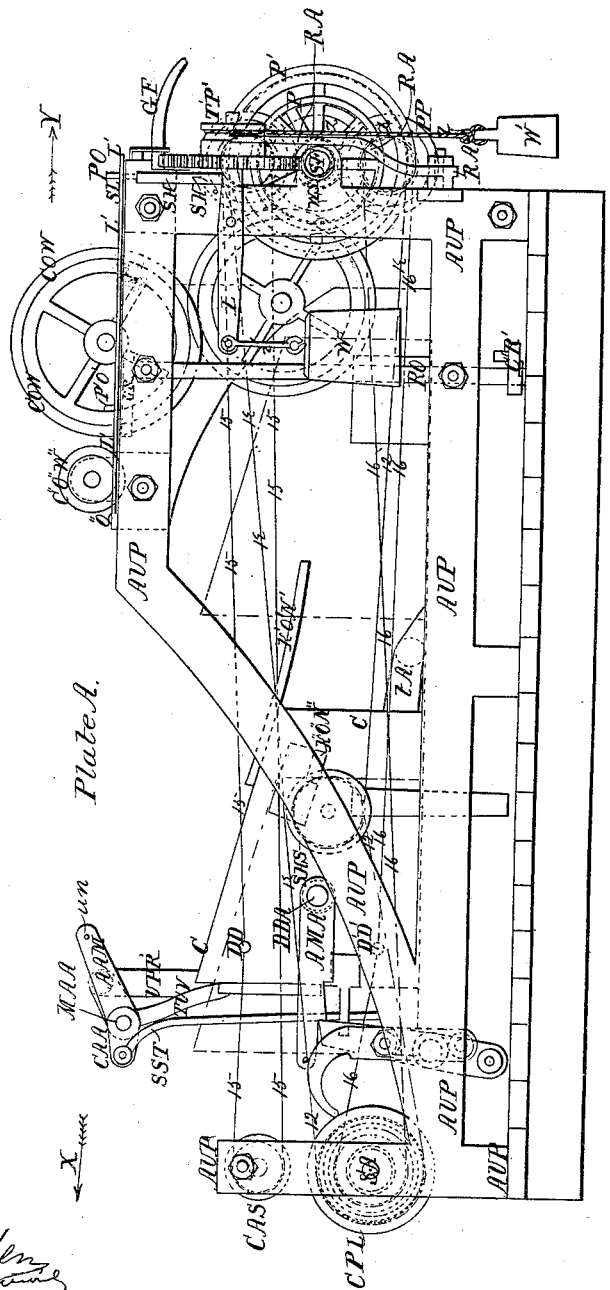

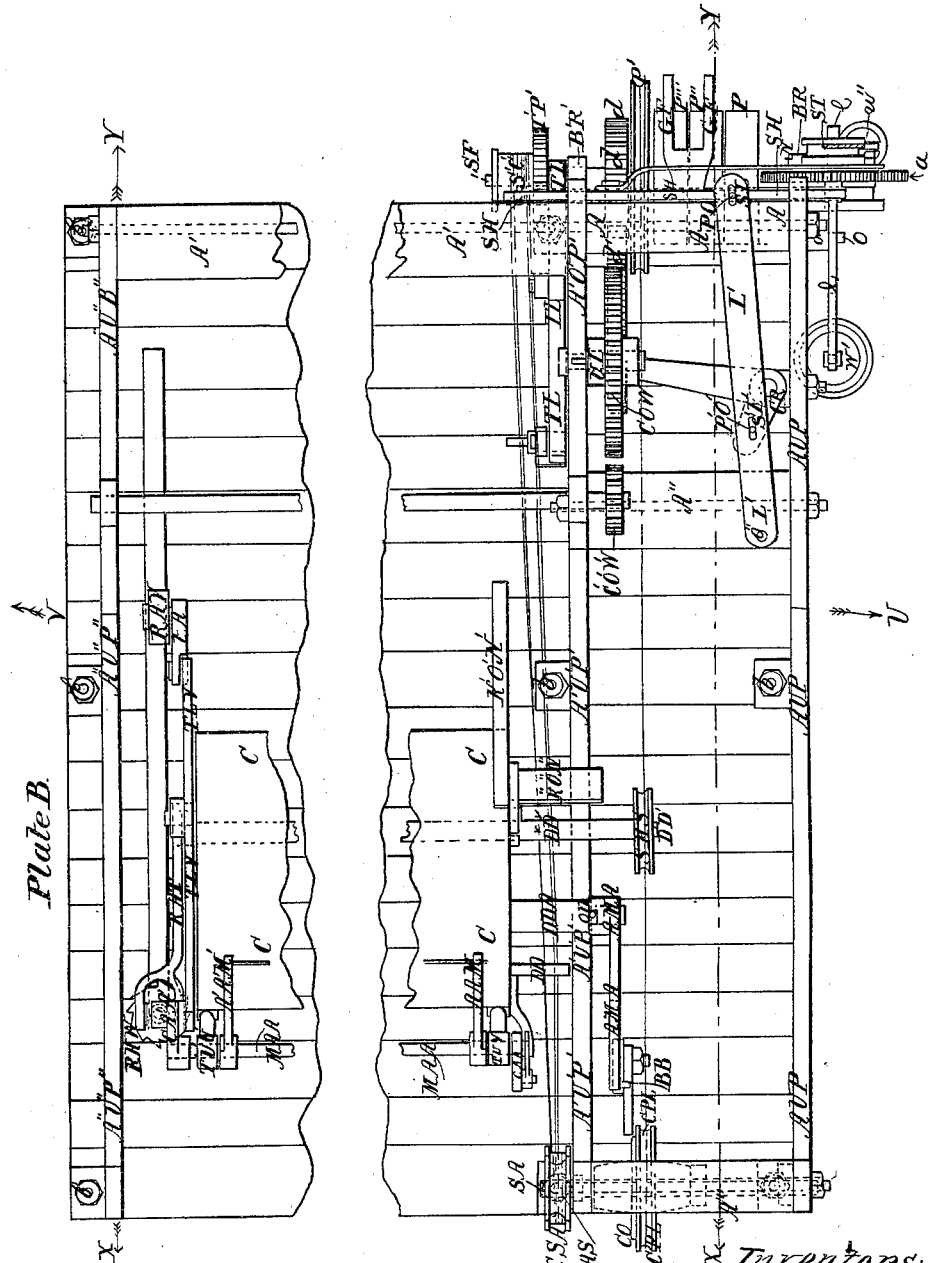

N° 86,156. Patented Jan. 26, 1869.

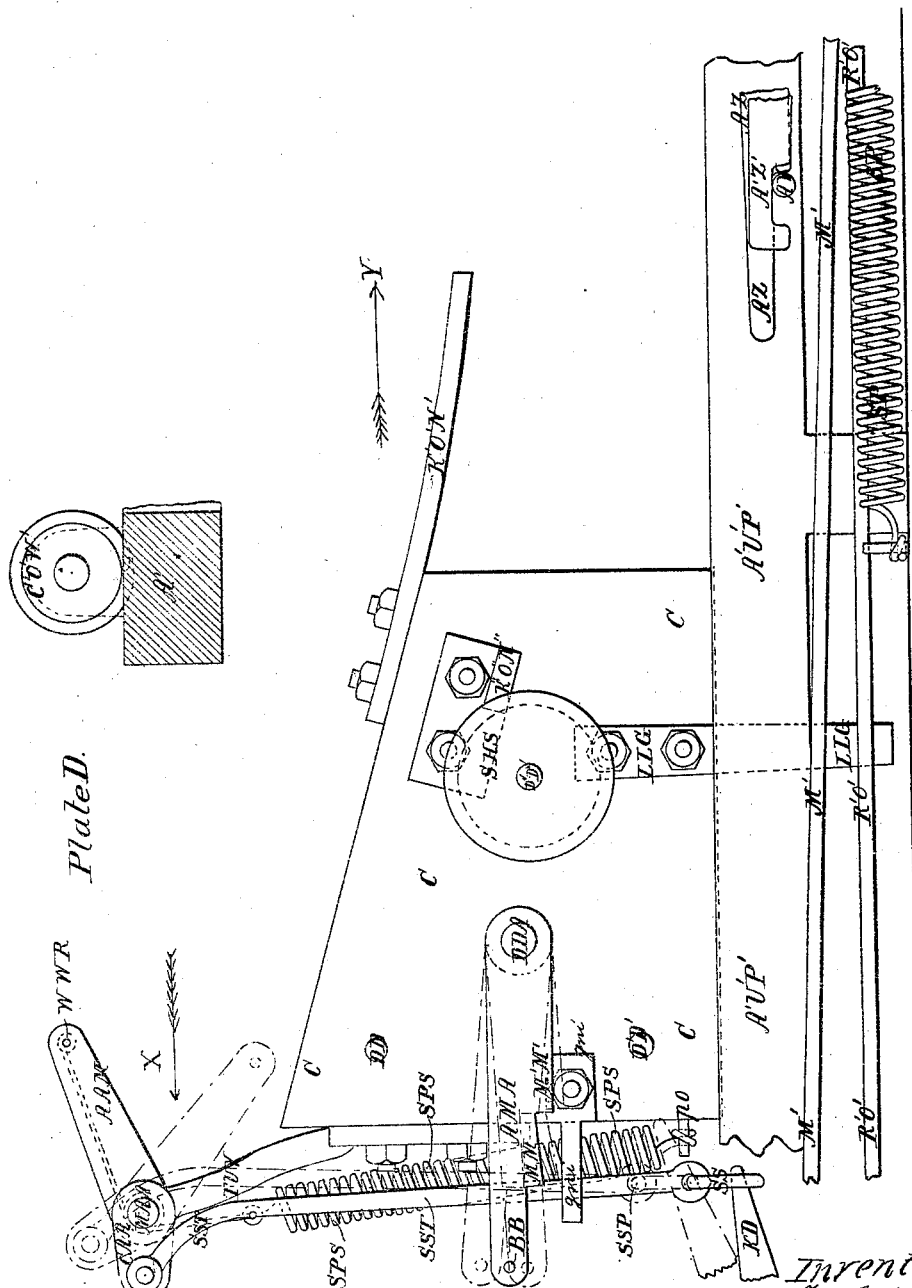

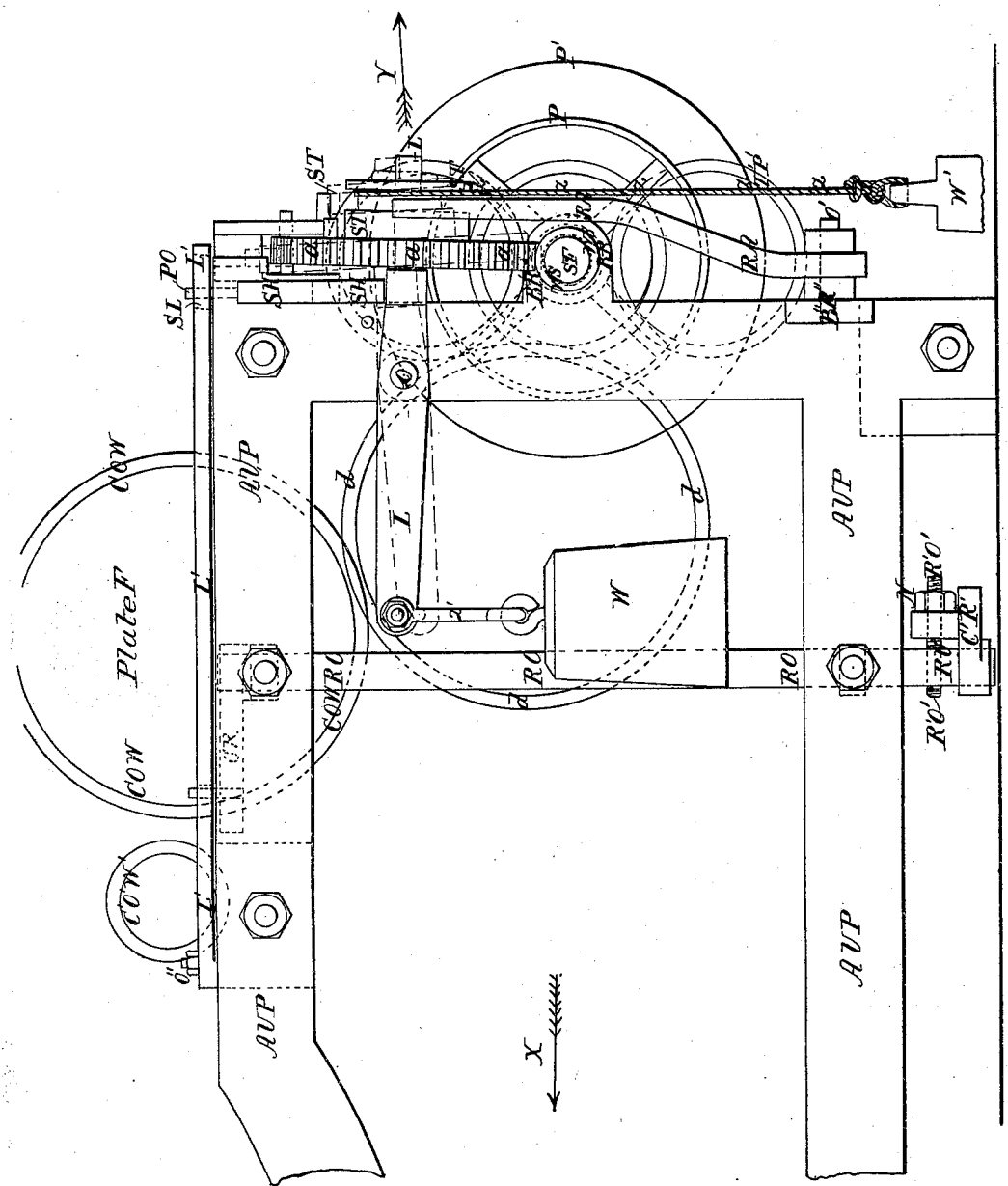

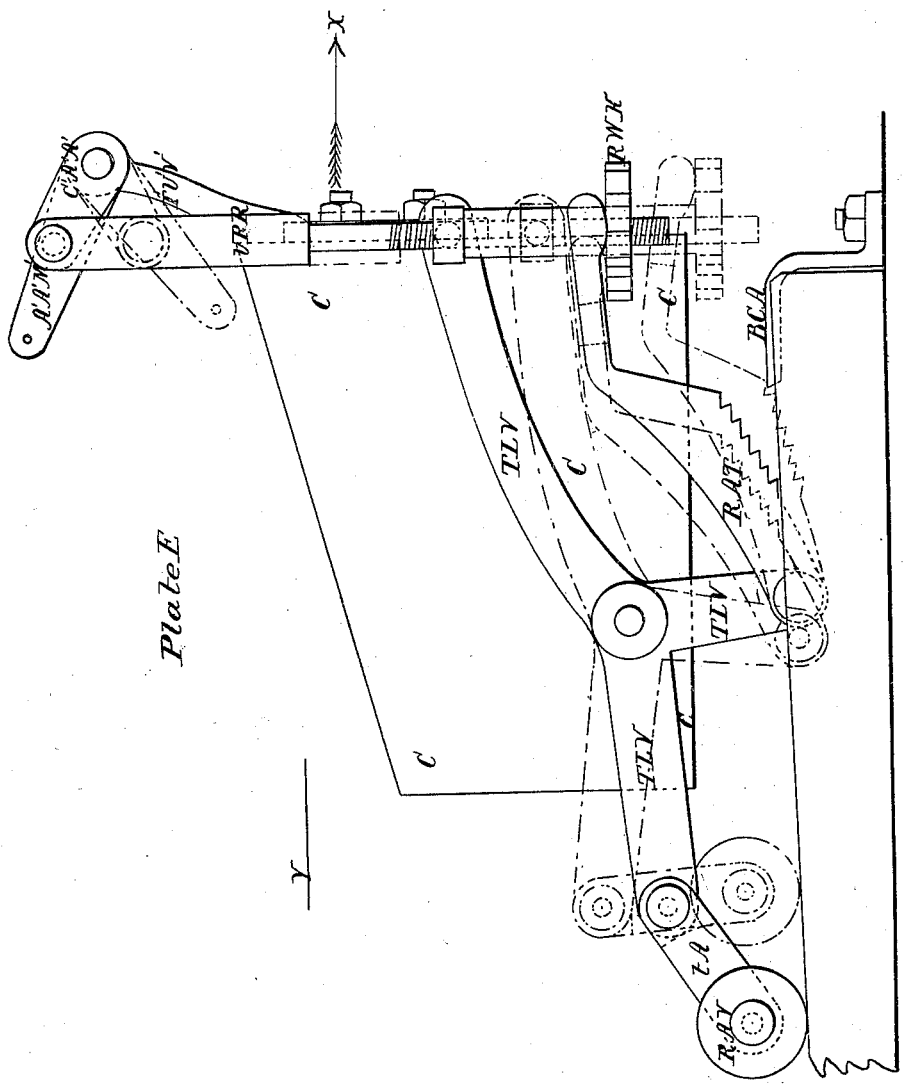

Sheet 7 - 9 Sheets.
Holcroft, Pearson & Shore
Spinning Mach.
N°86,156. Patented Jan. 26, 1869.
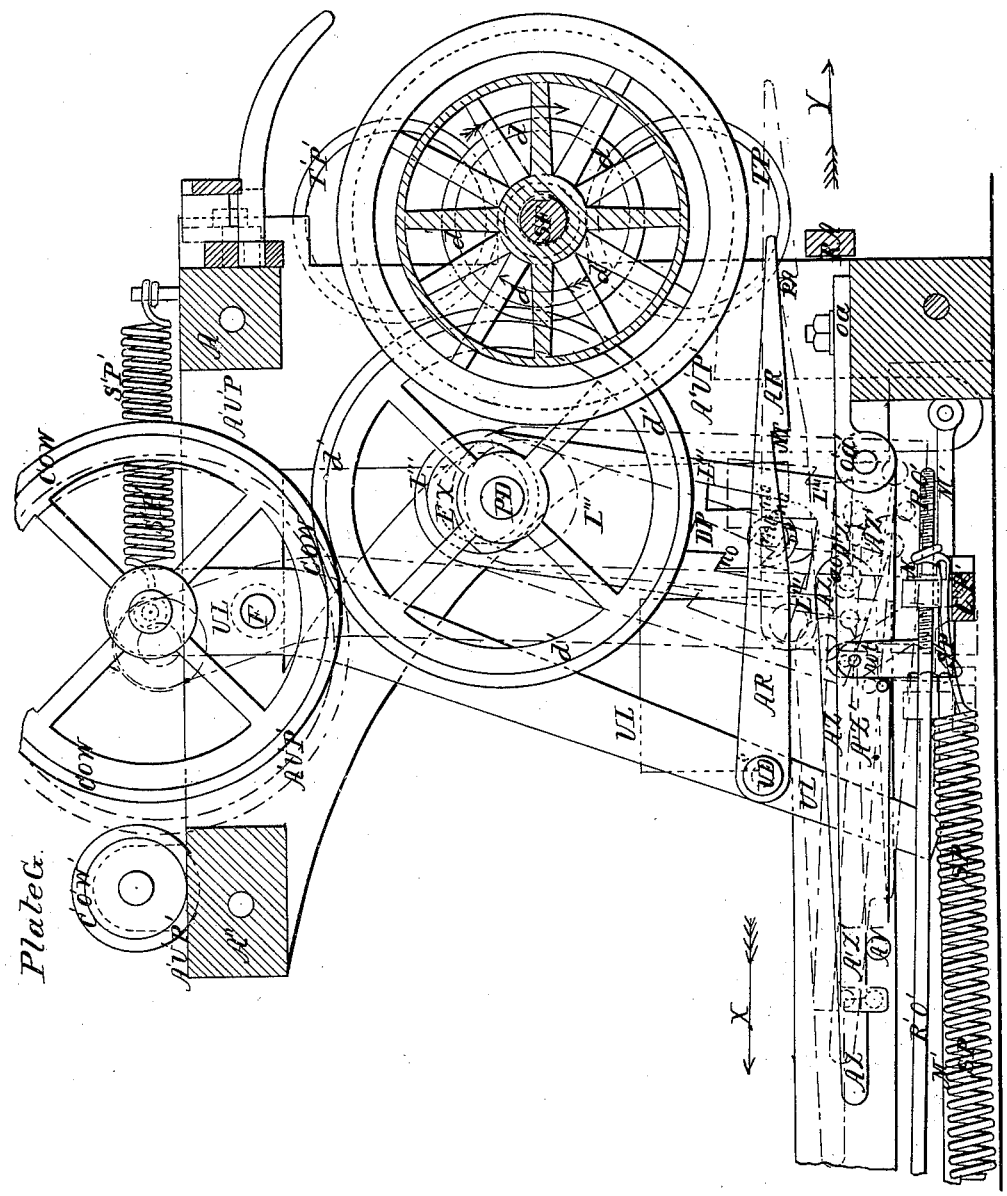
Plate G.
Witnesses,
Inventors,

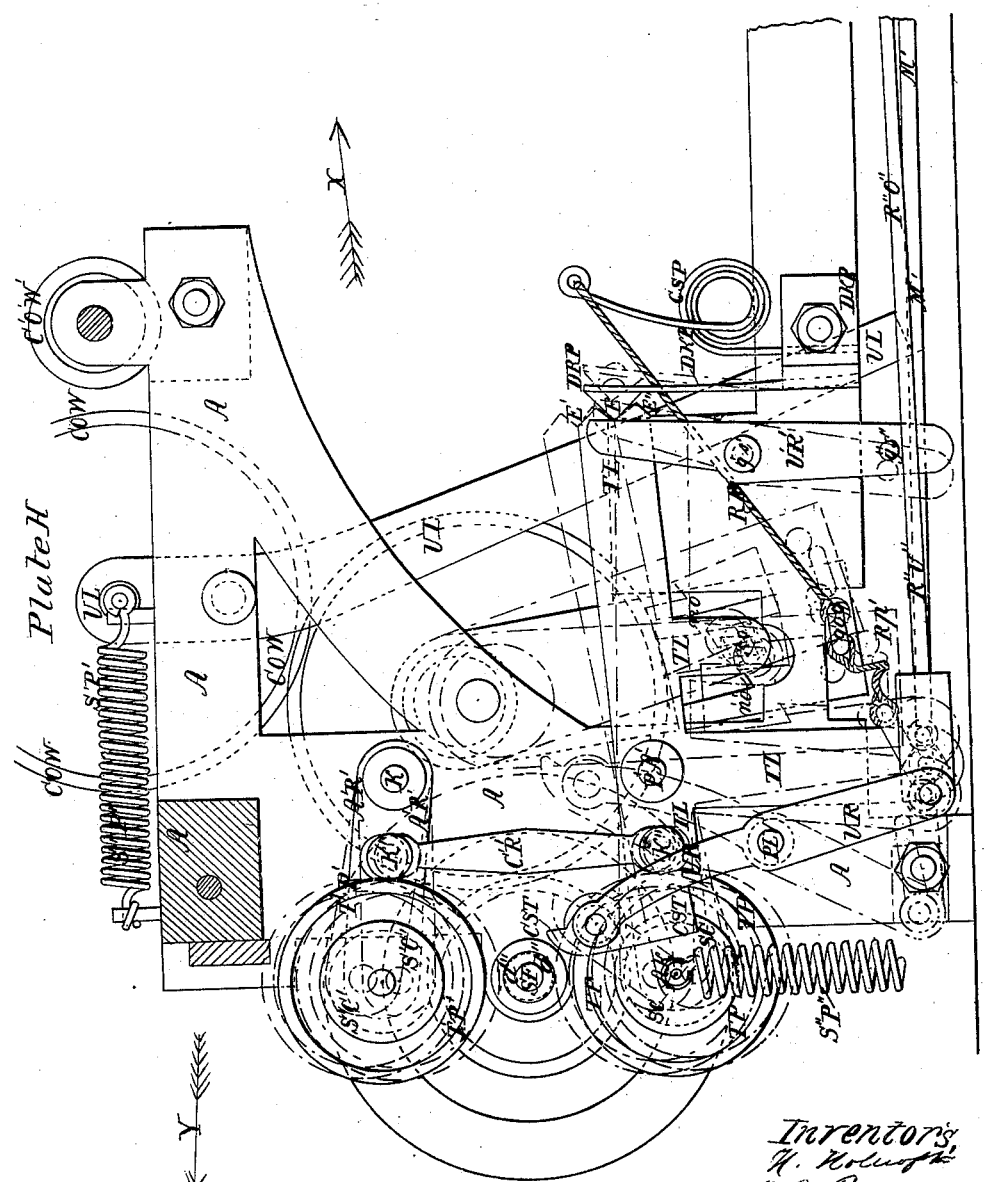

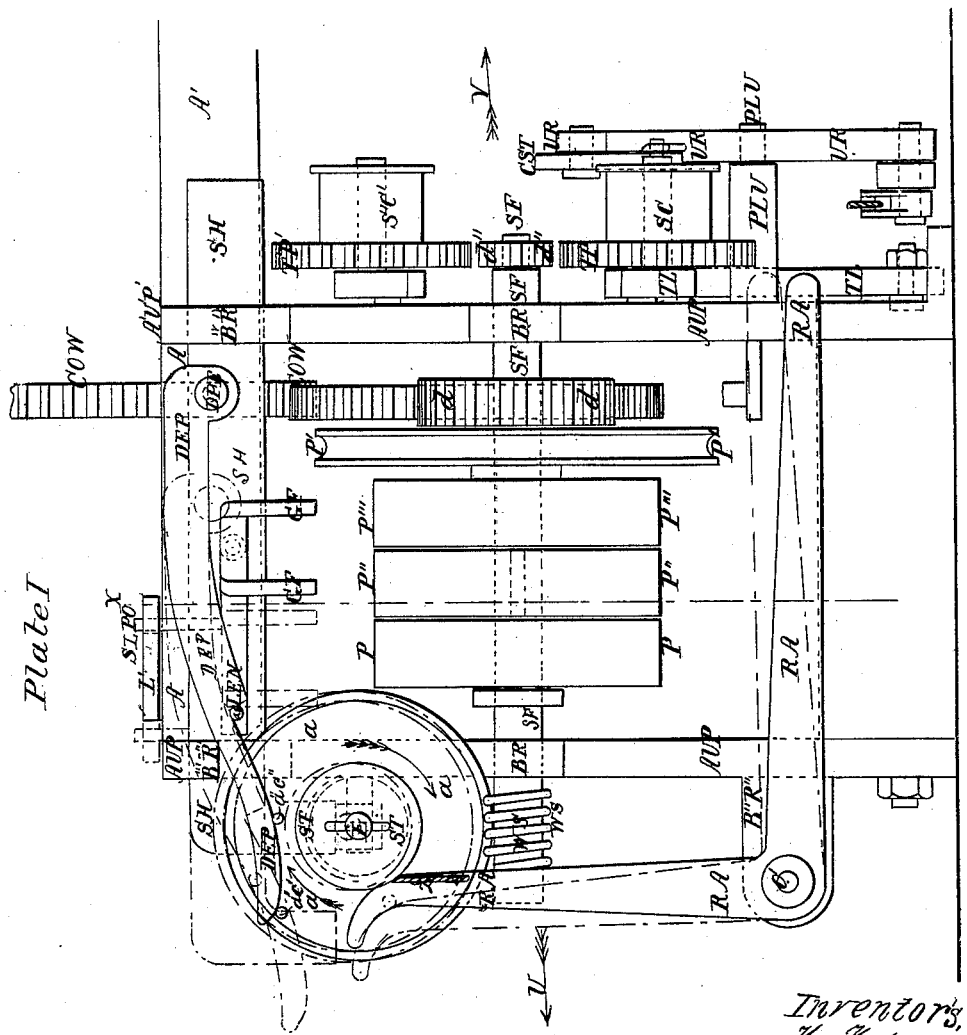

United States Patent Office.

HENRY HOLCROFT, F. R. PEARSON, AND R. SHORE, OF PHILADELPHIA, PENNSYLVANIA.

*Letters Patent No. 86,156, dated January 26, 1869.*

IMPROVEMENT IN SELF-ACTING SPINNING-MACHINE.

The Schedule referred to in these Letters Patent and making part of the same.

*To all whom it may concern:*

Be it known that we, HENRY HOLCROFT, F. R. PEARSON, and R. SHORE, all three of the city of Philadelphia, in the county of Philadelphia, in the State of Pennsylvania, have invented a new and useful Improvement in Self-Acting Spinning-Machines; and we do hereby declare that the following is a full and exact description thereof, reference being had to the accompanying drawings, making a part of this specification, in which—

Figure Plate A is an end elevation view of our machine.

Figure Plate B, a plan view of the same.

Figures 1, 2, 3, Plate C, are views in plan and elevation, enlarged scale, of details of our machine.

Figure Plate D is an elevation view of one end of the carriage.

Figure Plate E, an elevation view of the other end of said carriage.

Figure Plate F, an elevation view of part of one end of our machine.

Figure Plate G, an elevation view of the eccentric and gearing-connection.

Figure Plate H, an elevation view of the part of our machine opposite the view shown in Plate G.

Figure Plate I, an elevation view of the front of our machine.

The nature of our invention consists in the combination of certain mechanical devices which can be applied to any spinning-machine worked by hand or otherwise, and by means of which application any such machines will be easily and cheaply made self-acting.

To enable others skilled in the art to make and use our invention, we will now proceed to describe its construction and operation.

A U P, A' U' P', A" U" P", are three upright frame-pieces set parallel to each other on the floor, and held there by bolts $b\ b$, and connected together by wooden or metallic cross-ties A A' A" A''', the *ensemble* of said pieces and ties being the frame-work of our machine.

We will call X the front; U, the right-hand side; Y, the back; and V, the left-hand side of our machine. Said letters are repeated with arrows on each of our drawings.

S F is a horizontal driving-shaft, held in proper place by means of brackets B R B' R' on uprights A U P and A' U' P', said shaft S F bearing a worm-screw, W S, on its outer end.

P, P", and P''' are three pulleys on shaft S F. (See Plate I, enlarged scale.)

P and P''' are loose pulleys, and on the latter is attached a sheaf-wheel, P', running loose on shaft S F.

$d$ is a small cog-wheel set on shaft S F, on the left of sheaf-wheel P'.

$d''$ is a small pinion keyed on the inner end of shaft S F.

$a$, Plates F and I, is a cog-wheel set loose on a movable centre, and alternately gearing, as hereinafter shown, with worm W S.

It works on one end of a horizontal lever, L, parallel to the face of the frame A U P, and having its fulcrum at O.

W is a weight hanging from inside end of lever L.

When the said weight W is allowed to act on lever L, the said lever L and cog-wheel $a$ will occupy the respective positions shown in red lines, (Plate F.)

On the centre of wheel $a$ is attached a sheaf-wheel, S T, from which hang a rope and weight $r$ and W', so that when wheel $a$ revolves, the rope $r$ will be wound around wheel S T.

On the outside face of $a$ are set two pins, $a'\ c'$ and $a''\ c''$, designed to act on a drop, D E P, hereinafter described.

R A is a rectangular bent lever, having its fulcrum at O', and secured to the back of the frame by means of brackets B" R" from the side of the frame A U P.

The upper arm of said lever R A rests on wheel S T, and is there bent slightly outward. The other arm is horizontal, and rests under the lower edge of lever A R, as hereinafter shown.

S H is a horizontal shifter-bar, held in proper place by means of brackets $B^{iii}\ R^{iii}$ and $B^{iv}\ R^{iv}$.

G F is the belt-fork, or guide, attached to shifter S H.

The end of shifter S H, towards U, is bent downwards, and will alternately bear on lever L, back of wheel $a$. This will depress said lever, and thereby alternately gear and ungear wheel $a$ with worm W S.

Shifter S H works in the following manner:

L' is a transmitting-lever, set flat from A" to A, and having its fulcrum at O", and its other end slotted at S L.

P° is a pin, set into the top edge of shifter S H, and going up through slot S L in L'.

R O is an upright rod, having a crank-arm, C R, and C' R' on each end.

The pin P", of the upper crank C R, runs up through slot S' L', cut into lever L', thereby connecting shifter-bar S H to shaft R O and crank C R by means of the transmitting-lever L'.

The lower crank C' R', on shaft R O, is connected with horizontal rod R' O' (Plates F and G, and fig. 2, Plate C, in the following manner:

The end of rod R' O', towards the back of the machine, bears a thread, and passes through a small lug on crank C' R', and is held there by nut N.

S P is a spring, having one of its ends fastened to the floor, the other to rod R' O', outside of nut N, so that after rod R' O' has been shifted inward, spring S P will force it back to its former position.

When shifter-bar S H is in the position shown in Plate I, it is held there by drop D E P set on shifter S H by means of a stud, rivet, or bolt, and notched on its lower edge at L E N. Said notch catching on pin *a c*, set into piece A, prevents shifter-bar S H yielding, as it otherwise would, to the back action of spring S P.

We will hereinafter say where the outward end of rod R′ O′ is fastened.

C O W is a cog-wheel set on the end of an upright arm or lever U L, having its fulcrum at F, on upright A′ U′ P′, its lower end bearing against the outward edge of lower crank C′ R′ of crank-rod R O.

A R is a horizontal arm fastened at U D to lever U L, its lower end resting on a pin, P A.

In the lower edge of arm A R is a catch or notch, N T.

Set, as it is, on an oscillating arm, U, L, cog-wheel C O W can be shifted outwardly or inwardly by any power properly acting on lower end of lever U L, and thereby made to gear or ungear with pinions C′ O′ W′.

The upper end of said lever U L is held, as shown in black lines in Plate G, by spring S′ P′ fastened, one end to piece A, the other end to lever U L.

Cog-wheel C O W and pinion C′ O′ W′ are not only the means by which we revolve the feeding-rollers, (which, as our invention does not bear on them, are not shown or described,) but also, in their combination with lever U L, play, as hereinafter shown, an important part in our machine.

When the lower end of lever U L is pushed inwards, the notch in arm A R will catch on pin P A, and hold lever U L in the position shown in red lines, Plate G, thereby gearing wheel C O W with pinion C′ O′ W′.

T L is a T-lever. It is set at P′ A′ (its fulcrum,) on the inner face of upright A′ U′ P′, as shown in Plate H.

T P is a cog-wheel set on a pin, A K, on lever T L, and which, by means of said lever T L, may be made to gear or ungear with pinion *d″*.

T′ P′ is a cog-wheel of the size of T P, and set on end of arm A′ R′, which is itself secured by its other end to the inner face of upright A′ U′ P′ at K.

C′ R′ is a rod connecting lever A′ R′ to lever T L at K′ and K″, so that any movement imparted to lever T L will impart a corresponding movement to lever A′ R′, and cog-wheel T′ P′ can thereby be also geared or ungeared with pinion *d″*, and the length of connecting-rod C′ R′ is so calculated as to never have but one of the wheels T P or T′ P′ gearing with pinion *d″*, while at other times neither of them will gear with it.

S″ P″ is a spring, attached, one end to floor, the upper end to stud of wheel T P.

On the face of both wheels T P and T′ P′ are scrolls S C and S′ C′, for the purpose hereinafter shown.

On lower end of the vertical arm of "T-lever" T L is attached a horizontal rod, M′, running toward the front of the machine, and having its other end fastened to an upright lever, M, having its fulcrum on face of upright, A′ U′ P′, at Q.

A M is an upright arm, secured to M by means of bolt D A; and to its lower end is attached the outward end of rod R′ O′, as shown at G‴ C‴, fig. 2, Plate C. The upper end of lever A M is bent forward, for a purpose hereinafter shown.

C P L and C O, is a clutch-pulley, of which C P L is the pulley, and C O, the cone.

The pulley is loose on the shaft S A, and the cone tight.

The shaft S A and lever S′ A′ are constructed as follows:

The shaft S A runs through upright A′ U′ P′ at G A, through the cone, to which it is secured, thence through pulley C P L, which runs loose in it, and thence fits into sleeve S′ A′, and runs through upright A U P at G′ A′.

L A D is a hanging-down arm, acting as a crank to sleeve S′ A′, to which it is secured.

The lower end of arm L A D is connected with lever A M by means of connecting bent rod S Y, which has a thread cut on its outward end, which runs through the lower end of arm L A D, and is held there by means of nuts *n u* and *n′ u′*, whereby the position of L A D is adjusted at will.

On the end of sleeve S′ A′, toward the inner face of upright A U P, is a collar, C S, having an oblique or wedge-shaped slot N S, into which a cam, C M, secured to upright A U P, fits.

Now, when arm L A D is in the position shown in black lines in fig. 2, Plate C, the wedge-shaped slot N S is open, and the pulley C P L will thus run loose on its cone C O; but, when arm L A D, as hereinafter shown, comes forward, as shown in red lines, fig. 2, Plate C, it closes said slot N S with cam C M, which, being wedge-shaped, will wedge out arm L A D against the collar on wheel C P L, and thereby set it tight on its cone, and the clutch will thus run tight.

On the end of shaft S A is set a sheaf-wheel C S A.

C A S is another sheaf-wheel, set on a stud, S T A, secured to the face of upright A′ U′ P′.

U R, Plates H and I, is an upright lever, having its fulcrum and pin P L V secured to the face of upright A′ U′ P′. Said pin P L V must be long enough to allow lever U R to clear scroll S C.

C S T is a small cam, set on the inside face of the head of lever U R, and is held by means of a loose bolt or rivet, and may occupy both positions shown in black and red lines in Plate H.

To the lower end of lever U R is attached a rod, R″ O″, running outwardly through bracket B U P, secured to upright A′ U′ P′, fig. 3, Plate C.

Rod R″ O″ has a thread on said outward end, and two nuts, U N and U′ N′, on said thread.

U N is for the purpose of holding in proper place a spring, S R P, one end of which is secured to the floor, the other to rod R″ O″ at U N.

U′ N′ is for governing the inward stroke of rod R″ O″.

K D is a catch-lever, set above rod R″ O″, and secured to bracket B U P, by means of a pin, *l d*. Said catch K D, as shown in fig. 3, Plate C, catches on nut U N, thereby holding rod R″ O″ forward, as shown in black lines, same figure; and, when, as shown in red lines, catch K D is lifted up, spring S R P brings rod R″ O″ backward, so that nut U′ N′ rests against the bracket B U P.

On the back of our machine, *d′* is a cog-wheel, gearing with C O W and *d*.

Said wheel *d′* is set on a pin, P D, secured to upright A′ U′ P′; and on the back of said wheel *d′* is an eccentric, E X, from which hangs an arm, L‴, slotted in its lower end, as shown at D P, both inner vertical sides of said slot D P being notched at *n o* and *n′ o′*.

Opposite the slot D P in arm L‴, an opening is cut through upright A′ U′ P′, through which passes a lug, *m o*, somewhat of the "lozenge" shape, attached to the longer arm of "T-lever" T L.

We will hereafter show that, when certain movements of arm L‴ occur, the catch formed by notches *n o* and *n′ o′* will alternately catch on the upper and lower edges of lug *m o*, thereby lifting or lowering, in proper time, the arm of lever T L, to which the lug *m o* is attached.

A Z is a horizontal arm, with a catch in its lower edge, and secured to arm L‴ at *a o*, so that it may alternately be lifted and dropped at certain times.

A′ Z′ is another arm, set by the side of A Z, and secured to the floor, or any other suitable place, as shown at *o′ d′*.

Both arms A Z and A′ Z′ have their ends, toward the back of the machine, resting on a pin, A V, set into upright A′ U′ P′, and the forward end of A′ Z′ is bent downward, in order to hold a pin passing under the end of arm A Z, so that, when arm A′ Z′ is lifted, it will carry up arm A Z with it.

*r o t* is a small cam, secured to arm A′ Z′, and hanging downward. It may, at times, occupy the position shown in black and red lines, Plate G.

On the lower end of arm L‴, a little lower than lug m o, is secured a pin, g o o, protruding through the inner face of upright A′ U′ P′, passing under said upright.

R p is a cord or chain, connecting pin g o o with coil-spring C S P.

R′ p′ is a cord or chain, connecting the same pin g o o with a small lug on lower end of lever U R.

E is an angular notch in the end of longer arm of lever T L, and the top and lower edge are cut wedge-shaped, as shown at E′ and E″.

D K P is an upright spring, secured to upright A′ U′ P′, bearing a triangular cam on its upper end, which will hold lever T L alternately in one of the three positions shown in black and red lines in Plate H.

The thickness of said triangular cam must be twice, or thereabout, the thickness of lever T L, so that it will protrude laterally, and on the protruding portion will rest a small upright lever, U′ R′, hung on a pin, (its fulcrum,) g′ s′, secured to upright A′ U′ P′.

On the lower part of U′ R′, and on its outside face, and a little above the rod R″ O″, is a pin g″ s″.

C is the carriage. It is made in the ordinary shape, and we lay no claim on any special construction.

K′ O′ N′ is a lug or arm, set on the top of the end of carriage C, next A′ U′ P′, as shown in Plate D, and pointing backward.

On the end of said carriage C is set another lug, K″ O″ N″, near but shorter than arm K′ O′ N′, and also pointing backward.

D^v D^v is the cylinder or tin roller-shaft.

It is set in its proper place in the carriage C, and on its end is a sheaf-wheel, S H S.

The length of cylinder D^v D^v is such, that sheaf-wheels P′ and S H S and clutch-pulley C P L will be and work in a straight line.

12 is an endless band, connecting wheels and pulley S H S, P′, and C P L. It passes partly around pulley and wheel C P L and P′, but goes entirely around sheaf-wheel S H S.

15 is a band or chain, tied on to pin D D, which is fixed to the carriage C, going around pulley C A S, then up around pulley S′ C′, and then fastened again to pin D D.

16 is a band, starting from pin D′ D′ on carriage C, passing around (downward) pulley C S A, then around (downward) pulley S C, then to pin D′ D′ again, where it is fastened.

We lay no claim on any particular mode of running the carriage C, either with wheels on rails, or slides on rods.

D D A is a protruding lug, secured to carriage C, and on to which an arm, A M A, is set loosely.

O D, Plate B, is a notch cut into the collar of arm A M A, and which, by means of a pin set into lug D D A, holds said arm A M A in proper place, allowing it to take, alternately, either of the positions shown in red or black lines, Plate D.

B B is a pin, inserted into end of arm A M A, and protruding outward from one side.

L L G is a lug, pointing downward, and secured to the side of carriage C.

T U V and T′ U′ V′ are two bent arms, respectively secured to the front top edge, at each end, of carriage C, and holding a shaft, M A A, which bears a crank, C A A and C′ A′ A′, respectively on each end, and side-pieces A A M and A′ A′ M′, and rod or wire W W R.

S S T is a rod, hanging downward from crank C A A, passing through guide g u i, which holds it parallel to back of carriage C, and on the lower end of said rod S S T is a stirrup, S S.

The length of rod S S T, and size of stirrup S S, must be such that S S may, at times, take hold of lever K D, and lift it. (Plate D.)

S P S is a spring, attached, at its lower end, to pin p a, set into the back of carriage C, and its upper end passing over M′ A A, and fastening on rod or wire W W R.

In its normal position, spring S P S keeps arms A A M, A′ A′ M′ and wire W W R in the position shown in black lines in Plate D; but the whole may occupy the position shown in red lines in same figure, which would stretch spring S P S.

On the end of carriage C, is the ordinary arrangement of devices by means of which the yarn is governed as it winds on the bobbins. Said arrangement is composed of "T-lever" T L V, pawl R A T, ratchet-wheel R W H, screwed on lower end of upright rod U P R, R A V being the roller, and t A its arm.

We do not describe the operation of the said devices, which we do not claim as ours, as they have been in use for a long time. We have shown them in our drawings, to give a better idea of the *ensemble* of our machine.

Now, in order to describe the operation of our machine, we will start from the moment when the carriage C is in the position shown in Plate A, viz, when it stands back, the spindles being spinning, and consequently the carriage C being stationary.

At that moment, arm A M A bears its first notch on to head of lever M, which it has thus pushed outward. This has shifted rod R′ O′ forward, said rod acting on crank C′ R′, and, through rod R O, on crank C R, lever L′, and pin P O. The forward movement of R′ O′ has shifted shifter-bar S H, so that the drop D E P, having caught its notch L E N on to pin a c, holds shifter-bar there, and the belt passing between the prongs of guide G F will now bear, half on pulley P″, and half on pulley P‴.

Again, in the described position of shifter-bar S H, its bent end now bears on lever L, back of cog-wheel a, and gears said wheel with worm W S, on shaft S T. Meanwhile, the outward end of rod R″ O″ has its nut, U N, caught under the notch of drop K D, so that the rope, cord, or chain R p′ is slackened, and spring C S P has drawn the lower end of eccentric-lever L‴ outward.

Lug m o, on lever T L, stands right in the centre of the opening D F, cut into L‴, as afore described.

Spring D K P has its head, E, resting in the middle notch of arm T L, and pinion d″ stands between wheels T P and T′ P′, gearing, then, with neither. In the mean time the belt is, as aforesaid, running on both pulleys P″ and P‴.

This imparts motion to wheel d d, in the direction shown by circular arrows in red ink, Plate G, the effect of which movement we will explain below.

The belt, bearing on pulleys P″ and P‴, drives sheaf-wheel P′, and, by means of endless band, cord, or chain 12, imparts the spinning-movement to the spindles and bobbins of the carriage.

In the meanwhile, the rotary movement of wheel a slowly brings pin a′ c′ in contact with under edge of drop D E P, while cord r, of weight W′, is wound around scroll S T. As it continues to go up, pin a′ c′ will lift up drop D E P, which will lose its hold on pin a c, so that the shifter-bar and its drop will be suddenly shifted toward U, (this new position being shown in red lines, Plate I.) Lever L, being no longer depressed by the bent portion of shifter-bar S H, will yield to the action of weight W, and resume the position shown in red lines, Plate F, so that cog-wheel a gears no longer with worm W S. Meanwhile, weight W′, the cord of which is partly wound around scroll S T, will fall to the full length of its cord, thus reversing cog-wheel a to its starting-position.

When the shifter-bar S H is moved, as last described, rod R' O' is also moved, and its nut N, in its outward movement, strikes cam *r o t*, thereby lifting up both arms A Z and A' Z'.

This brings lever L''' forward, and the lower notch *n' o'* of slot on L''' lifts up lug *m o* on T L, which gears the upper wheel T' P' with pinion *d''*, which sends the carriage C still further outward.

Again, when rod R' O' is shifted outward, lever A M, falling back, lifts up arm A M A, which, following the onward movement of the carriage C, to which it is attached, catches, with its second notch, on to head of M, thereby acting on rod M' so as to ungear wheel T' P' from pinion *d''*, and gearing, instead, wheel T P with the said pinion *d''*, when the carriage will thereby begin to travel inward.

Now, the movement of shifter-bar S H toward A U P has allowed rod R' O' to be moved outward, so that this has acted on the clutch-pulley, which is now tight, and although the action of the belt on pulleys P'' and P''' has ceased, the impetus of said pulleys will be strong enough to act on band 16, around scroll C S A, and drive carriage C further outward. In this outward movement, stirrup S S will lift drop K D, which will allow rod R'' O'' to be moved inwardly by spring S P. This movement tightens the rope R *p'*, before slack, and the lower end of eccentric-lever L''' will be shifted, so that the upper notch of opening, in said lever L''', will bear on lug *m o*.

The outward movement of carriage C has another effect, as follows:

The arm A M A, being thus forced against upright lever M, acts on it, and therefore on rod M', which, thus shifted inward, causes the lower wheel T P, on "T-lever" T L, to gear with pinion *d''*, on shaft S F, effect already begun by the inward movement of rod R'' O'', (described in another part of this specification,) and which is made sure and effective by the simultaneous action of the described combination of both movements. Meanwhile, the belt, as aforesaid, bearing and acting on pulleys P and P'', the carriage C will begin to travel, being driven inwardly by band or chain 16, and scrolls C S A and S C.

In the inward movement of carriage C, the impetus of sheaf-wheel P' has first died out; then the movement has become reversed, and the sheaf-wheel P' and S H S, and pulley C P L, run now reversely, imparting a reversed movement to the bobbins through sheaf S H S and its shaft D^v D^v.

As carriage C travels inward, lug K' O' N' strikes catch C S T, on head of lever U R, thereby shifting rod R'' O'' outward, where it is held, as before, by means of drop K D catching on nut U N.

This has slackened rope R *p'*, so that spring C S P, renewing its action, has drawn the lower end of lever L''' to such a position that lug M O, on lever T L, works, once more, right in the centre of the opening in lever L'''.

As carriage C advances further in, cam C S T yields to the pressure of lug K' O' N', which forces itself over it, and, the carriage C continuing inward, lug K'' O'' N'' strikes against lever U L of wheel C O W, and causes it to gear with pinion C' O' W'.

The movement we have just described, also forces the lower end of lever U L to bear against the end of lower crank C' R', whereby the shifter-bar is returned to its former position.

Meanwhile lever A R has caught on pin P A, which will keep wheel C O W geared with pinion C' O' W', until the rectangular bent lever R A, acted upon by pin *a'' c''*, in face of wheel *a*, gearing, once more, with worm W S, will lift said lever A R, and cause it to lose its hold on pin P A.

Next, lug L L G will strike against pin *q'' s''*, on lower end of lever U' R', and thereby forcing its head against spring D K P, which will force said spring to lose its hold on the middle notch in outward arm of T L, and spring C S P will now draw lever L'' toward it.

The outward movement of L''' will no longer be opposed by levers A Z and A' Z', (formerly catching on pin A^v,) which have been lifted up by the action on cam *r o t* of lower crank C' R' of the shifter-bar device.

As soon as spring D K P has lost its hold, the outward arm of lever T L will go up, thereby gearing upper cog-wheel T' P' with pinion *d''*, and the carriage C will begin travelling outward whence it came.

As the carriage goes outward, the lug K'' O'' N'' presses no longer against lever U L, so that when, by the action of lever R A, arm A R is lifted up, spring S' P' will recall wheel C O W backward, and said wheel will cease to gear with pinion C' O' W'.

Again, when arm A M A reaches upright lever M once more, the same series of successive and simultaneous movements will take place as above described.

Here ends the description of the construction and operation of our machine, the novelty, simplicity, and qualities of which we will now endeavor to show.

From the above description it is easy to infer that our machine is self-acting. All its movements have a reciprocal action, and are calculated and combined so as to require scarcely any control at all but that of a boy.

It is known to all spinners that, when the carriage is approaching the gearing-point, it must near it very slowly, so as to avoid any rebound; therefore, when we slacken the speed of the carriage, if we had no means of controlling and governing the speed of the spindles and bobbins, we would often have trouble with the yarn, which might break.

But, in our machine, as the speed of the spindles is derived from sheaf-wheel S H S, which receives its movement from clutch-pulley C P L, and as said pulley C P L is itself driven by scroll C S A, as, when carriage C travels slowly, scroll C S A, and all pulleys and sheaf-wheels connected with it, also revolve slowly, and with a speed, at all times, proportionate to that of the carriage C, it is obvious that, at all times, also, the spindles and their bobbins will have a speed entirely dependent on that of the carriage.

In our mechanism we dispense with bevelled gearing, all we use being direct.

Having described our invention,

What we claim, and desire to secure by Letters Patent of the United States, is—

1. The combination of cog-wheel *a*, lever L, weight W, and its cord or hanging rod, *r'*, scroll S T, and its weight W', and cord or hanging rod, *r*, and pins *a' c'* and *a'' c''*, with a spinning-machine, the whole constructed and operated in the manner and for the purpose above set forth and described.

2. The combination of shifter-bar S H with drop-catch D E P, transmitting-lever L', pins P°, and P'°, crank C R, upright rod R O, and crank C' R', the whole constructed and operated in the manner and for the purpose above set forth and described.

3. The combination of upright lever A M with bent rod S Y, arm L A D, sleeve S' A', and shaft S A, pulley C P L, and its cone, C O, the whole constructed and operated in the manner and for the purpose above set forth and described.

4. The combination of cam C M with slotted collar C S on sleeve S' A', the whole constructed and operated in the manner and for the purpose above set forth and described.

5. The combination of the lever U L with lug K'' O'' N'', catch A R, bent lever R A, pins P A and A'' C'' on face of cog-wheel *a*, for gearing and ungearing cog-wheel C O W, with pinion C' O' W', the whole constructed and operated in the manner and for the purpose above set forth and described.

6. The combination of wheel *d'*, its eccentric, E X, and slotted and notched lever L''', with cog-wheel $d$ on driving-shaft S F, the whole constructed and operated in the manner and for the purpose above set forth and described.

7. The combination of lever L''' with drop-catches A Z and A' Z', constructed and operated in the manner and for the purpose above set forth and described.

8. The combination of lever L''', notched at N O and N' O', with lug M O on "T-lever" T L, the whole constructed and operated in the manner and for the purpose above set forth and described.

9. The combination of "T-lever" T L, cog-wheels T P and T' P', their scrolls S C and S' C', lever A' R', connecting-rod C R, and spring S'' P'', the whole combined, constructed, and operated in the manner and for the purpose above set forth and described.

10. The combination of lever U R, rod R'' O'', its drop-catch, K D, its spring, S R P, with pin or lug $g$ $o$ $o$, lever L''', cords R $p$ and R $p'$, and spring C S P, the whole constructed and operated in the manner and for the purpose above set forth and described.

11. The combination of sheaf-wheel P' and S H S, and clutch-pulley C P L C O, connected together by band, cord, or chain 12, with carriage C for regulating and controlling the speed of the spindle and bobbin, the whole combined, constructed, and operated in the manner and for the purpose above set forth and described.

12. The mode of stopping and reversing the movement of the spindles by means of the additional outward movement given to carriage C before it starts from its stationary point to travel inward, the said additional outward movement being obtained in the manner above set forth and described.

HENRY HOLCROFT.
     F. R. PEARSON.
     R. SHORE.

Witnesses:
 LIONEL D'EPINEUIL,
 J. H. BOWDEN.